United States Patent [19]

Enterline et al.

[11] 4,312,265
[45] Jan. 26, 1982

[54] SCREW FOR EXTRUDING A FOOD MASH

[75] Inventors: William R. Enterline; Dennis G. De Wald, both of Muncy; James R. Boose, Montgomery, all of Pa.

[73] Assignee: Koppers Company, Inc., Pittsburgh, Pa.

[21] Appl. No.: 154,368

[22] Filed: May 29, 1980

[51] Int. Cl.³ .............................................. A47J 27/14
[52] U.S. Cl. ...................... 99/348; 366/158; 366/319
[58] Field of Search ................ 99/323.4, 348, 325, 99/353, 443 R; 366/50, 81, 319, 322, 341, 158; 425/208

[56] References Cited

U.S. PATENT DOCUMENTS

| | | | |
|---|---|---|---|
| 2,838,794 | 6/1958 | Munger | 366/81 |
| 3,008,184 | 11/1961 | Fritsch | 425/208 X |
| 3,246,594 | 4/1966 | Fisher | 366/158 X |
| 3,248,469 | 4/1966 | Kosinsky | 425/208 X |
| 3,861,287 | 1/1975 | Mavser | 99/348 |

*Primary Examiner*—Edward J. McCarthy
*Attorney, Agent, or Firm*—Thomas F. Shanahan; Herbert J. Zeh; Oscar B. Brumback

[57] ABSTRACT

An extruder screw for use in the processing of a food mash is disclosed, in which, the mash is introduced into an inlet opening in an extruder barrel and conveyed by a substantially coextensive screw to an outlet or discharge opening and then through an extrusion die. The extruder screw comprises a single flight helical screw section initiating at the inlet opening and terminating within the extruder barrel, with a flightless section immediately following thereafter, and, a further helical screw section immediately following the flightless section and extending to the proximity of the outlet opening of the extruder barrel.

11 Claims, 2 Drawing Figures

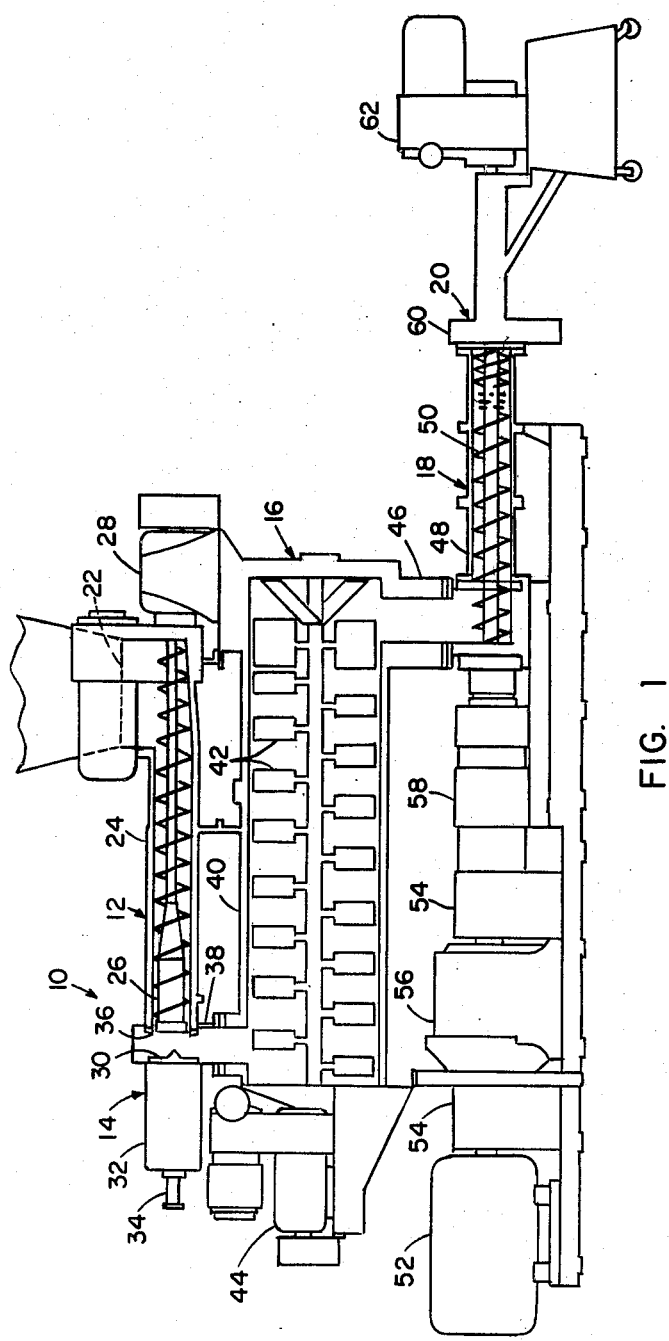
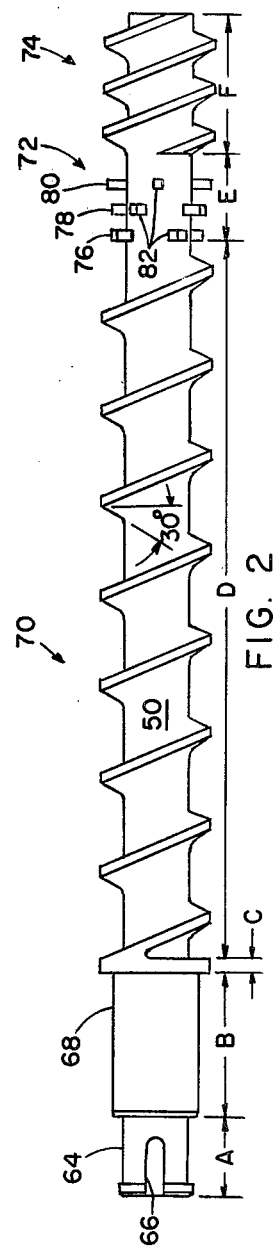
FIG. 1
FIG. 2

SCREW FOR EXTRUDING A FOOD MASH

BACKGROUND OF THE INVENTION

1. Field of the Invention

This invention relates to an extruder screw and, more specifically, to an extruder screw for use with apparatus for preparing and processing a cooked, farinaceous mash. In particular, the present invention relates to an extruder screw for use with apparatus for continuously pressure cooking, extruding and forming pellets of a food product and, in which, the apparatus includes a pressure feeder assembly, a seal plate assembly, a pressure cooker assembly and an extruder assembly, which is then normally followed by a cutoff assembly for pelletizing the extruded product.

2. Description of the Prior Art

The present invention is an improvement in and for applicants' assignee's cooker/extruder apparatus which is fully disclosed in U.S. Pat. No. 3,246,594 to C. D. Fisher, the disclosure of which is intended to be incorporated herein by reference.

Briefly, disclosed in the aforesaid U.S. Pat. No. 3,246,594 is an apparatus for continuously pressure cooking various cereal materials, under superatmospheric steam conditions, to produce a cooked, extrudable mash and, then, extruding the cooked mash through a plurality of die orifices. The fabricated extruder screw, shown in the patent, is essentially a double flight screw, in which, within the screw barrel, the flight sections are interrupted or cut at several locations to provide rectangular slots in or through the flights to promote intermingling of the mash carried in the respective flight channels. Also, shown in part in the patent, are an additional pair of flight segments at the terminal end of the screw for the purpose of enhancing more uniform distribution of the mash at the extruder die.

In general, a double flight screw of screw section, as shown in the patent, is selected because it discharges product in a more uniform stream than a corresponding single flight screw or screw section. However, difficulties were encountered with the double flight screw design of the patent in getting a wide variety of mash materials of differing viscosity to move at a desired uniform rate into and through the extruder barrel. Accordingly, the fabricated extruder screw design was modified to include a single flight section across the extruder inlet, followed, in series, by a double flight section extending through the major portion of the barrel, a flightless section provided with lugs for mixing the mash and a second, relatively short, double flight section at the terminal end of the screw.

The above fabricated construction has worked satisfactorily over a number of years. However, recently attention was given to substituting machined screws for the prior art fabricated screws, primarily for reasons of improved screw strength and screw flight uniformity, as well as potential cost savings. In so doing, a number of screw designs were considered, it being understood that screw design is as much, or more so, a matter of art and experience, rather than a strict application of precise scientific principles. From this activity evolved the present screw design which, surprisingly, when placed in an actual production situation and with no change in any other operating parameters, significantly increased the throughput of the extruder, while fully maintaining a high standard of product quality.

SUMMARY OF THE INVENTION

In accordance with the present invention, there is provided an improved extruder screw for use in the processing of a food mash. The improved screw of the invention comprises a single flight helical screw section constructed and arranged to initiate at the inlet opening of an extruder barrel and terminate within the interior of the barrel, a flightless section immediately following the initial single flight section and a further helical screw section immediately following the flightless section and terminating at the proximity of the outlet of the extruder barrel.

The foregoing and other objects, features and advantages of this invention will become more apparent during the course of the following description when taken in conjunction with the accompanying drawings and appended claims.

BRIEF DESCRIPTION OF THE DRAWINGS

FIG. 1 is a generally schematic illustration of a partial cross-section of a cooker/extruder processing arrangement for which the present invention is specifically adapted.

FIG. 2 is a longitudinal view of the improved extruder screw of the invention.

DESCRIPTION OF THE PREFERRED EMBODIMENT

Referring to FIG. 1, there is shown schematically a typical cooker/extruder apparatus 10 to which the present invention specifically relates. As therein illustrated, the apparatus 10 generally comprises a pressure feeder assembly 12, a seal plate and seal plate drive assembly 14, a pressure cooker assembly 16, an extruder assembly 18 and a cut-off assembly 20. As shown, pressure feeder assembly 12 includes a feed inlet 22 into a horizontal, cylindrical, pressure feeder barrel 24 containing a pressure feed screw or conveyor 26 provided with a suitable drive means 28. Mounted in opposed or confronting relation to pressure feed screw 26 and barrel 24 is a pressure seal plate 30, actuated by seal plate drive assembly portion 32 and a double-acting, piston-cylinder assembly 34. Also indicated is a seal ring 36, between the seal plate 30 and pressure feed barrel 24.

A feeder discharge housing 38 is shown providing communication between a terminal portion of the pressure feeder assembly 12 and the pressure cooker assembly 16. Pressure cooker assembly 16 essentially comprises an elongated vessel 40 containing rotary mixing paddles 42, suitably journaled therein and provided with a drive means 44. Also, as is fully explained in the aforesaid patent, pressure cooker vessel 40 is suitably provided with means (not shown) for introducing therein superatmospheric steam and water or other liquids.

At the discharge end of cooker vessel 40 is shown an extruder inlet 46 to extruder assembly 18. Extruder assembly 18 is comprised of three extruder barrel segments 48, an extruder screw 50, screw drive means 52, couplings 54, a gear reducer 56, a bearing assembly 58 and, at the discharge end of the extruder barrel, an extruder die (not shown). Finally, there is shown a cut-off assembly 60, of conventional construction, for producing pellets of the extruded food product and a cut-off drive 62, also of known construction.

Briefly, the operation of the above apparatus proceeds by dry cereals, grains or other food materials entering the system at the pressure feeder inlet 22. The variable speed drive 28 on the pressure feed screw 26 controls the feed rate into the pressure cooker assembly 16. The seal plate drive assembly includes a double-acting pneumatic cylinder 34 to maintain pressure of the seal plate 30 against the pressure feed screw discharge. This pressure causes the formation of a plug of material, to effectively seal against steam passing from the cooker into the pressure feed barrel 24. By a combination of counter-rotation and the configuration of the seal plate 30, the plug of material is abraded as it enters the cooker to provide quick, uniform heating.

Thermal processing of the material first occurs in the pressure cooker vessel 40. A variable speed, paddle-type conveyor 42 in the cooker controls both the degree of agitation and the retention time of the material. Normal retention time is one to four minutes. During this period, pressurized or superatmospheric steam and water or other liquids can be added. Material passes from the discharge of the pressure cooker assembly 16 to the inlet 46 of the extruder assembly 18. The extruder assembly 18 is basically a screw conveyor which converts mechanical energy to heat and pressure. At the end of the extruder the material passes through an extruder die, which can have a variable number of active holes of selected shape, and is then cut into pellets by cut-off assembly 60 powered by cut-off drive 62.

Referring, now, more particularly to FIG. 2, there is shown an extruder screw constructed in accordance with the present invention. The particular extruder screw shown has a coupling or drive connection portion 64 at one end, provided with suitable opposed keyways 66 (one of which is shown), followed by a shaft portion 68 which, in operative assembly, cooperates with a mechanical shaft seal (not shown) to seal the screw shaft against escape of superatmospheric steam and/or cooked mash. The remainder of the extruder screw 50 resides within the extruder housing proper and includes an initial, major longitudinal portion comprising a single flight screw section 70, a relatively minor flightless longitudinal section comprising a transition and mixing bar section 72 and terminating with a relatively short longitudinal section of double screw flights 74. Although a single screw flight may be used, double screw flights are preferred at the terminal end of extruder screw 50 to enhance even distribution of mash at the die orifices. Both the single flight screw section 70 and the double flight screw section 74 are provided with flights having rearward facing flanks provided with a 30° backtaper, as shown, and forward flanks (not shown) that are substantially perpendicular to the land area of the flights.

The transition and mixing bar section 72 is comprised of three longitudinally spaced sets 76, 78 and 80 of square bars, in which the bars 82 of each set reside in a common plane perpendicular to the axis of extruder screw 50 and extend radially outwardly of the main shaft body to the approximate crest height of the adjacent screw flights. Each set 76, 78 and 80 of square bars consists of four bars arranged angularly 90° apart with each successive set of bars being angularly displaced from its adjacent set by 30°. Each bar 82 is $\frac{3}{4}"\times\frac{3}{4}"\times 1\frac{3}{4}"$ long.

With regard to additional specific details of the extruder screw shown, the screw root diameter is $4\frac{3}{4}"$ and has a crest diameter of a nominal $7\frac{3}{4}"$. The screw length dimensions A through F are, respectively, $5\frac{1}{8}"$, $9\frac{3}{8}"$, $1"$, $46\frac{5}{8}"$, $6"$ and $9"$. In both the single flight section 70 and the double flight section 74, the flight pitch is 6 inches, right hand. Generally, the ratio of screw pitch to screw diameter should be maintained relatively constant for screws of different diameters than as above specifically described. For the particular screw shown, the extruder inlet portion is about $12"$ in length, with the remainder of the screw length, i.e., about $4'\ 2\frac{5}{8}"$, residing in and completely circumscribed by the extruder barrel.

TEST RUN

The disclosed prior art fabricated screw, when new and operating at full power (100 H.P.) in a cooker/extruder manufactured by applicants' assignee, produces animal feed nuggets at a rate of about 8500 lbs./hr. The machined screw of this invention was substituted for the fabricated extruder screw in the cooker/extruder, with no change in any other operating parameter, and, at full power, increased the average measured rate for the same high quality product to 13,671 lbs./hr., or a 61% increase in capacity or throughput.

Moreover, the screw of the invention has been shown to have $2\frac{1}{2}$ to 3 times the life of the prior art fabricated screw before reworking is required. For prior art screws, normally reworking was routinely performed after about 8000 to 10,000 tons of production, whereas the present screw can be used for 26,000 to 30,000 tons of product before reworking. While a fabricated screw, constructed in accordance with this invention, will give a desired increase in throughput over prior art screws, obviously the increase in working life of a machined screw, before reworking, presents a material advantage over fabricated screws.

According to the provisions of the patent statutes, the foregoing explains the principle, preferred construction and mode of operation of the invention and there has been illustrated and described what is now considered to represent its best embodiment. However, it should be understood that, within the scope of the appended claims, the invention may be practiced otherwise than as specifically illustrated and described.

What is claimed is:

1. Apparatus for extruding a food mash which comprises:
    (a) an extruder barrel having inlet and outlet openings; and
    (b) a substantially coextensive extruder screw disposed within said barrel;
    (c) said extruder screw having a single flight helical screw section initiating at said inlet opening and terminating within said barrel, which initial section is immediately thereafter followed by a flightless section having a plurality of bars arranged in axially spaced planes and extending radially to within the proximity of the inner walls of said extruder barrel and which flightless section, in turn, is immediately thereafter followed by a further helical screw section extending to the proximity of said outlet opening, said further helical screw section comprising at least a double flight section.

2. Apparatus as in claim 1 wherein the flights of said helical screw sections have tapered trailing surfaces and substantially flat leading surfaces.

3. Apparatus as in claim 2 wherein the root diameter of said flight sections is substantially uniform throughout the length of said extruder screw and the pitch of said flights is substantially identical.

4. Apparatus for continuously pressure cooking, extruding and forming pellets of a food product, which apparatus includes a pressure feeder assembly, a seal plate assembly, a pressure cooker assembly, an extruder assembly and a cut-off assembly and, in which, said extruder assembly comprises:
   (a) an extruder barrel having inlet and outlet openings;
   (b) a substantially coextensive extruder screw disposed within said barrel; and
   (c) said extruder screw having a single flight helical screw section initiating at said inlet opening and terminating within said barrel, which initial section is immediately thereafter followed by a flightless section, and which flightless section, in turn, is immediately thereafter followed by a further helical screw section extending to the proximity of said outlet opening.

5. Apparatus as in claim 4 wherein said further helical screw section comprises at least a double flight section.

6. Apparatus as in claim 5 wherein said flightless section includes a plurality of bars arranged in axially spaced planes and extending radially to within the proximity of the inner wall of said extruder barrel.

7. Apparatus as in claim 5 wherein the flights of said helical screw sections have tapered trailing surfaces and substantially flat leading surfaces.

8. Apparatus as in claim 7 wherein the root diameter of said flight sections is substantially uniform throughout the length of said extruder screw and the pitch of said flights is substantially identical.

9. An extruder screw for use in the processing of a food mash in which the mash is introduced into an inlet opening in an extruder barrel and conveyed by a substantially coextensive screw to an outlet opening and, then, through an extrusion die, said screw comprising:
   (a) a single flight helical screw section initiating at said inlet opening and terminating within said barrel;
   (b) said initial section being immediately thereafter followed by a flightless section having a plurality of bars arranged in axially spaced planes and extending radially to within the proximity of the inner wall of said extruder barrel; and
   (c) a further helical screw section immediately following said flightless section and extending to the proximity of said outlet opening, said further helical screw section comprising at least a double flight section.

10. An extruder screw as in claim 9 wherein the flights of said helical screw sections have tapered trailing surfaces and substantially flat leading surfaces.

11. An extruder screw as in claim 10 wherein the root diameter of said flight sections is substantially uniform throughout the length of said extruder screw and the pitch of said flights is substantially identical.

* * * * *